United States Patent
Sassa et al.

(10) Patent No.: US 7,462,214 B2
(45) Date of Patent: Dec. 9, 2008

(54) VEHICULAR AIR-CONDITIONER

(75) Inventors: Yukiya Sassa, Nagoya (JP); Kenichi Kato, Nagoya (JP); Yasushi Kato, Toyota (JP); Hironobu Takeda, Nissin (JP)

(73) Assignees: Denso Corporation, Kariya (JP); Toyota Jidosha Kabushiki Kaisha, Toyota-shi (JP)

( * ) Notice: Subject to any disclaimer, the term of this patent is extended or adjusted under 35 U.S.C. 154(b) by 11 days.

(21) Appl. No.: 11/110,606

(22) Filed: Apr. 20, 2005

(65) Prior Publication Data

US 2005/0235833 A1    Oct. 27, 2005

(30) Foreign Application Priority Data

Apr. 21, 2004    (JP)    .............................. 2004-125447

(51) Int. Cl.
  *B01D 50/00*    (2006.01)
  *B61D 27/00*    (2006.01)
(52) U.S. Cl. ........................... 55/385.3; 454/75; 96/417
(58) Field of Classification Search ...................... 95/1, 95/8, 11, 12, 23; 96/417, 422; 55/385.3, 55/34; 454/158, 127
  See application file for complete search history.

(56) References Cited

U.S. PATENT DOCUMENTS 5,946,923 A * 9/1999 Samukawa et al. ............. 62/133

FOREIGN PATENT DOCUMENTS

| DE | 100 00 397 | 7/2001 |
|----|------------|--------|
| JP | 07-025221 | 1/1995 |
| JP | 08-310230 | 11/1996 |
| JP | 08-310230 | 3/1997 |
| JP | 02001328422 | * 11/2001 |
| WO | WO 01/00431 | 1/2001 |

OTHER PUBLICATIONS

English translation of JP 08-310230, Nov. 26, 1996, Inventor: Yuri Shojiro.*
English translation of JP07025221, Jan. 1995, Inventor: Hagino Mitsuaki.*

* cited by examiner

*Primary Examiner*—Steve McAllister
*Assistant Examiner*—Helena Kosanovic
(74) *Attorney, Agent, or Firm*—Harness, Dickey & Pierce, PLC

(57) ABSTRACT

A vehicular air-conditioner with a pollen mode setting intake to an inside air mode, vents to a face mode, and a blower air flow to a limit maximum air flow M1 between a minimum air flow Lo and a maximum air flow Hi (Lo<M1<M2<Hi), with an air-conditioning unit provided with a filter for trapping pollen and blowing clean air from which pollen has been removed from the vents to the vehicle compartment, whereby by starting the pollen mode simultaneously with the start of the engine, clean air is immediately blown to the vicinity of the face of the driver from the face vents and thereby the pollen entering the vehicle or pollen carried into the vehicle in the vicinity of the face is blown away, the air flow at this time being a maximum air flow M1 able to be withstood in terms of temperature sensation, so a pollen free comfortable environment being created without causing discomfort.

16 Claims, 9 Drawing Sheets

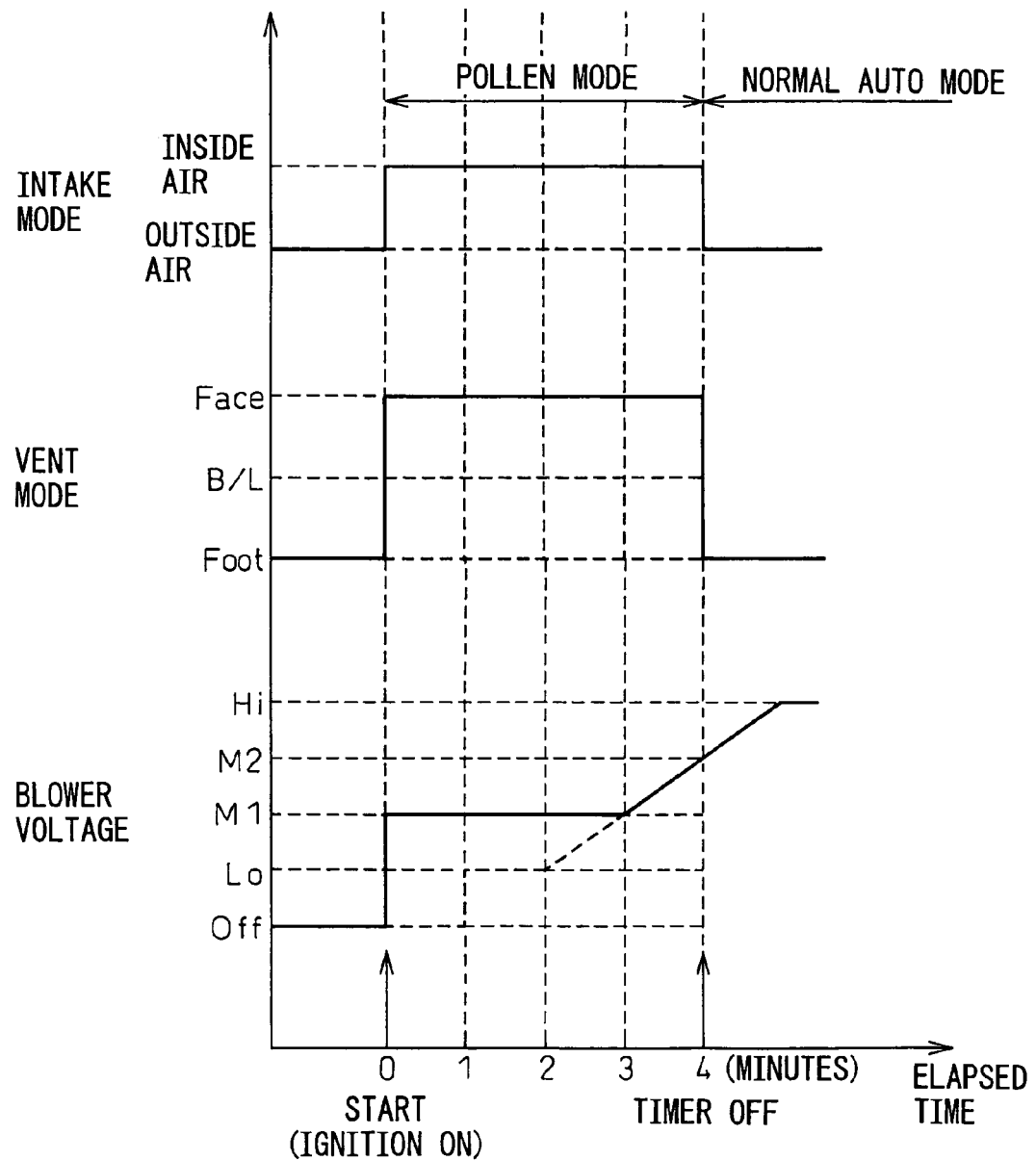

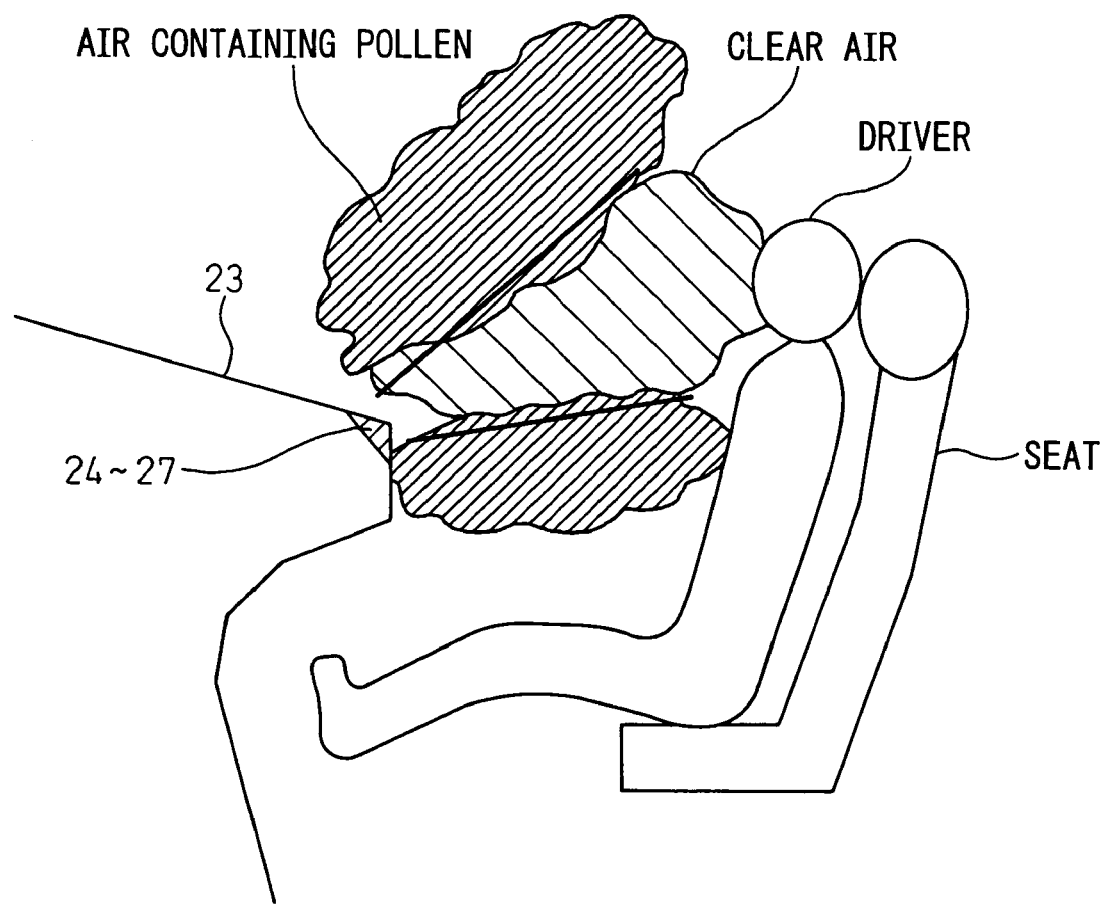

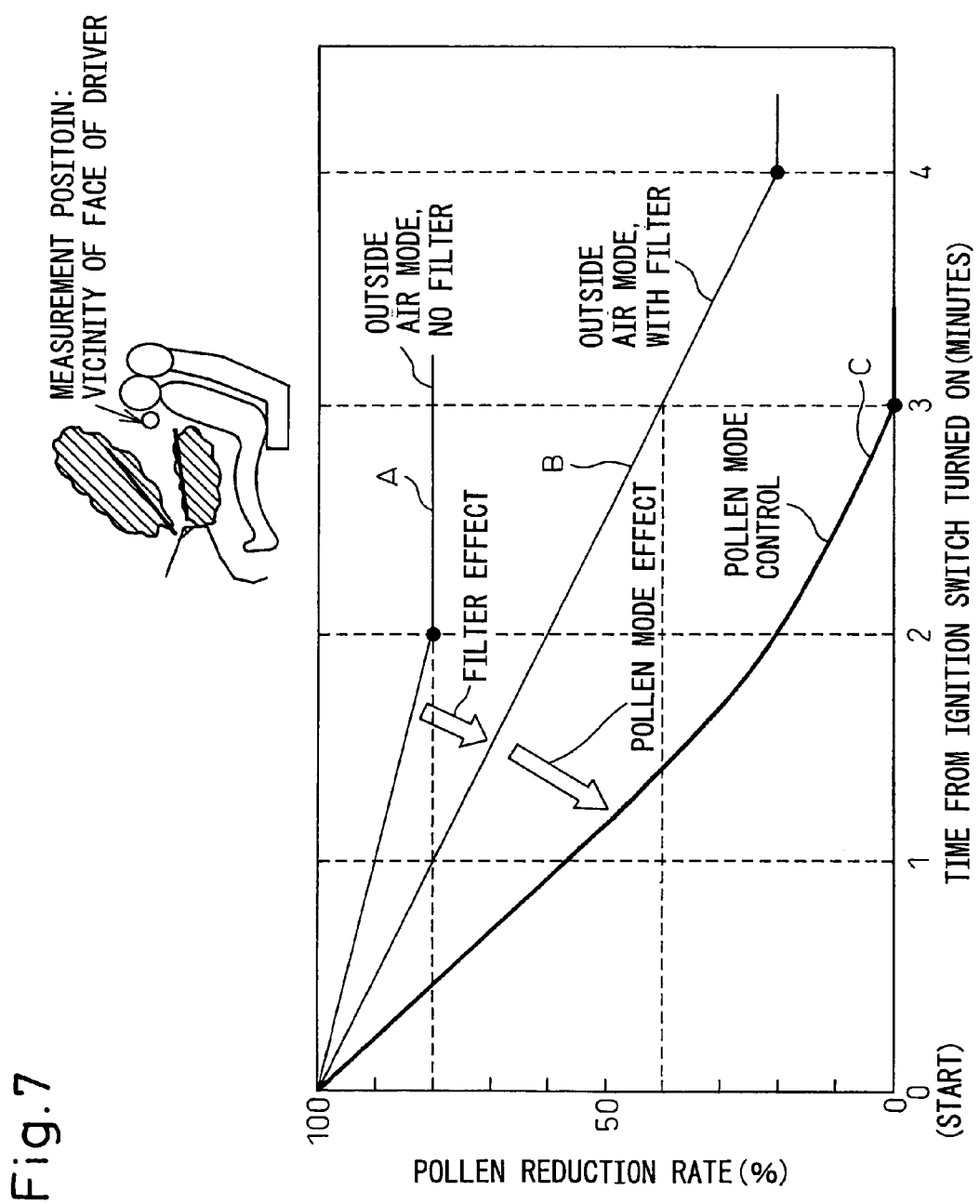

VEHICULAR AIR-CONDITIONER

BACKGROUND OF THE INVENTION

1. Field of the Invention

The present invention relates to a vehicular air-conditioner, more particularly relates to a vehicular air-conditioner able to reduce the effect of pollen on the driver so as to improve comfort.

2. Description of the Related Art

In recent vehicular air-conditioners, the flow of the air-conditioning air is mainly being controlled taking into consideration the sensation of temperature so as to realize comfort in the vehicle compartment (for example, see Japanese Patent No. 3430562).

Demands on air-conditioning comfort are becoming tougher. In particular, there is a growing need for taking the health of the driver into consideration, such as by removing pollen. As a system for this, a vehicular air-conditioner providing a pollen filter only in the outside air duct to remove the pollen from the outside air before blowing it into the vehicle compartment has been proposed (for example, see Japanese Unexamined Patent Publication (Kokai) No. 8-310230).

The system disclosed in Japanese Unexamined Patent Publication (Kokai) No. 8-310230 enables removal of the pollen entering along with the outside air from the outside air duct in the outside air mode, but cannot remove pollen entering from a door when the driver opens it to get into the vehicle or pollen deposited on the face, hair, or clothing of an entering driver, that is, the pollen carried-in. Therefore, the pollen entering from a door or carried-in fills the vehicle compartment and floats in the vicinity of the face of the driver to cause a hay fever attack.

SUMMARY OF THE INVENTION

An object of the present invention is to prevent pollen entering from a door or carried in from floating in the vicinity of the face of the driver and thereby to suppress the occurrence of a hay fever attack at the driver.

To achieve the above object, according to a first aspect of the present invention, there is provided a vehicular air-conditioner provided with blower control means (12b) for controlling a blower (12) provided in an air passage (10a) of an air-conditioning unit (10) and vent control means (17, 19, 21) for selecting at least one of a plurality of vents (16, 18, 20) provided at an end of the air passage and controlling the air from the blower so as to be blown from the selected vent to the inside of a vehicle compartment, wherein an operating mode where a vent able to blow air in the vicinity of the face of the driver is selected from the plurality of vents and a predetermined amount of air is blown from the selected vent to the vicinity of the face of the driver in the vehicle compartment, that is, a pollen mode, is set and the blower control means and vent control means are operated so that operation under the pollen mode is started along with an ignition switch (38) of the vehicle being turned on.

According to this aspect of the invention, along with the ignition switch being turned on right after the driver enters the vehicle, air is blown by the blower from a vent able to blow air to the vicinity of the face of the driver, so the pollen entering the vehicle compartment along with the door being opened when the driver gets into the vehicle and the pollen carried in deposited on the face, hair, or clothing of the driver getting in are quickly blown away from the vicinity of the face of the driver by the air from the vent. Due to this, it is possible to keep the amount of pollen down at least in the vicinity of the face of the driver (mucous members of eyes, nose, etc.) and suppress hay fever attacks.

In this case, if the air passage is provided with a filter (40, 40a) for trapping the pollen, air in which pollen is removed by the filter will be blown out from the vent, so it will be possible to enhance the effect of removal of pollen from the vicinity of the face of the driver.

Further, if the air-conditioning unit is provided at an upstream side of the blower with an inside/outside air switching door (11a) for switching between an outside air mode where air from outside the vehicle compartment is introduced and an inside mode where air inside the vehicle compartment is introduced and is provided with inside/outside air switching control means (11b) for controlling the inside/outside air switching door, and if, in the pollen mode, the inside/outside air switching control means controls the inside/outside air switching door to the inside air mode, even when the vehicle is in an environment heavy with pollen, setting the inside/outside switching door to the inside air mode will prevent pollen from entering the vehicle compartment from the inside/outside air switching door, so it will be possible to enhance the effect of removal of pollen entering the compartment or carried in from the vicinity of the face of the driver.

Preferably, the blower control means makes an level of the air flow of the blower at the time of start of the pollen mode a limit maximum air flow (M1) set to a magnitude between a minimum air flow (Lo) and a maximum air flow (Hi).

According to this, by making the flow of air blown to the vicinity of the face of the driver a limit maximum air flow of a magnitude between the minimum air flow and maximum air flow generated by the blower at the time of start of the pollen mode, it is possible to set the maximum air flow by which the driver would not feel discomfort taking into consideration the sensation of temperature of the driver and thereby possible to efficiently remove pollen from the vicinity of the face of the driver.

That is, in warmup control performed by an ordinary air-conditioner right after the ignition switch is turned on, the blower is kept in the off state for a predetermined time, then air is blown by the minimum air flow. Since air is not blown right away, the pollen in the vicinity of the face of the driver cannot be removed and therefore the driver will be exposed to the pollen entering or carried into the compartment. As opposed to this, according to this preferred mode of the invention, a limit maximum air flow of a relatively large air flow is generated without any warmup control immediately after the ignition switch is turned on, so it is possible to effectively remove pollen from the vicinity of the face of the driver in a short time.

Note that by having the blower control means control the air flow level in the pollen mode so that the limit maximum air flow continues for a first time from the start of the pollen mode and then increases along with the elapse of time, a smooth transition to the usual warmup mode becomes possible.

Further, in the pollen mode, by having the blower control means set the level of air flow at the time of start of the pollen mode to the minimum air flow (Lo) or stop the blower when a temperature of air blown to the vicinity of the face of the driver falls to a predetermined temperature or less and set the level of the air flow to a limit maximum air flow (M1) set to a magnitude between the minimum air flow and maximum air flow (Hi) when the blown air temperature exceeds the predetermined temperature, it is possible to keep or avoid relatively low temperature air from striking the vicinity of the face of the driver and prevent degradation of the air-conditioning comfort of the driver.

Preferably, in the pollen mode, the air flow is intermittently controlled so that the flow of air blown to the vicinity of the face of the driver is switched between the limit maximum air flow (M1) set to a magnitude between the minimum air flow (Lo) and the maximum air flow (Hi) and a first air flow of a level smaller than the limit maximum air flow.

According to this mode of the invention, since air of the relatively large limit maximum air flow intermittently strikes the vicinity of the face of the driver right after the ignition switch is turned on, it is possible to avoid discomfort caused by a relatively large flow of air continuously striking the vicinity of the face of the driver and to remove the pollen from the vicinity of the face of the driver without greatly detracting from the feeling of comfort of the driver.

This intermittent air flow control may also be performed by having the blower control means switch the level of the air flow of the blower between the at least two levels of the limit maximum air flow and first air flow or by having the vent control means alternately switch between a period of blowing air of the limit maximum air flow from a selected vent able to blow air to the vicinity of the face of the driver and a period of blowing air from a vent other than the selected vent.

Preferably, provision is made of a pollen mode start switch (39f), and the pollen mode is started by operation of the pollen mode start switch by the driver.

According to this mode of the invention, the pollen mode is started immediately by the driver operating the pollen mode start switch at the desired time, so when desiring to remove pollen entering the window when opening it to pay the toll at a toll booth on a highway etc., it is possible to interrupt the ordinary air-conditioning control and operate the air-conditioner in the pollen mode.

Further, if providing a pollen sensor (36) for measuring an amount of pollen in the vehicle compartment and starting the pollen mode when the amount of pollen measured exceeds a predetermined amount, in the same way as with the pollen mode start switch, it is possible to interrupt the normal air-conditioning control and operate the air-conditioner in the pollen mode when the amount of pollen entering the vehicle compartment becomes large while the vehicle is running in the outside air mode or when the amount of pollen carried in by the driver becomes large when the vehicle is stopped.

In this case, if ending the pollen mode when the amount of pollen measured falls to a predetermined amount or less, it is possible to automatically return to the normal air-conditioning control.

Alternatively, if ending the pollen mode after an elapse of a preset timer time from the start, it is also possible to automatically return to the normal air-conditioning control.

According to a mode of the invention, the operation under the pollen mode is given priority over the determined vent mode to calculate the basic target value of the air-conditioning control and to select the vent.

According to other mode of the invention, the operation under the pollen mode is performed by interrupting the air-conditioning control, in the normal auto mode, to calculate the basic target value of the air-conditioning control and to select the vent.

According to still other mode of the invention, provision is made of a judgment means for judging the operation requirement under the pollen mode, the judgment means judges the requirement when the ignition switch is turned on, when the pollen mode start switch is operated, and when a predetermined signal has been output from the pollen sensor, and the operation under the pollen mode is then performed.

Note that the reference numerals in parentheses after the above means show the correspondence with specific means described in the embodiments explained below.

These and other objects and features of the present invention will become clearer from the following description of the preferred embodiments given with reference to the attached drawings.

BRIEF DESCRIPTION OF THE DRAWINGS

FIG. 5 is a graph of the control characteristics in a pollen mode in the first embodiment of the present invention;

FIG. 6 is a view of the state where clean air strikes the area in the vicinity of the face of the driver;

FIG. 7 is a graph showing the rate of pollen reduction versus time;

DESCRIPTION OF THE PREFERRED EMBODIMENTS

Figure 1:
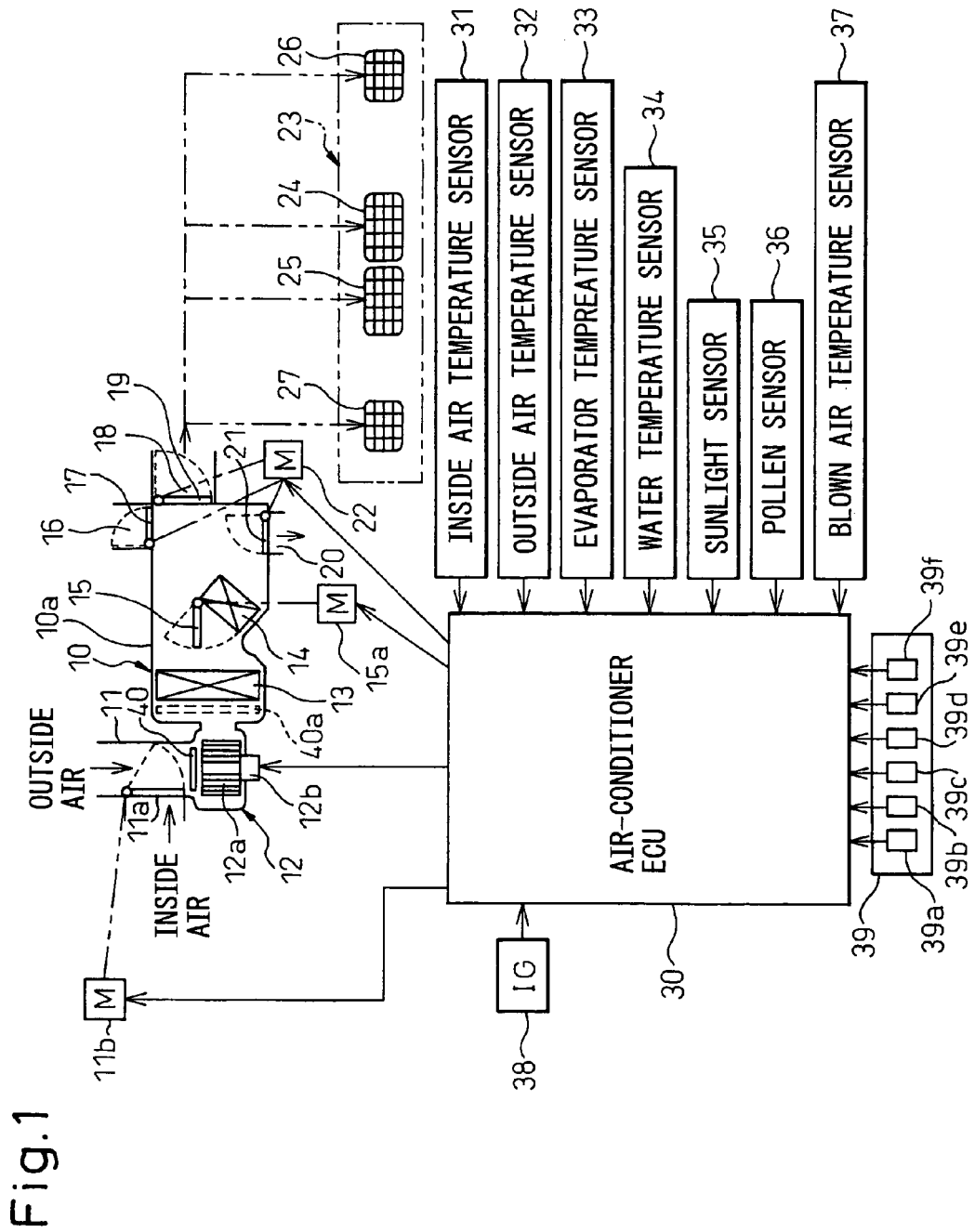
FIG. 1 is a view of the overall system of a vehicular air-conditioner of a first embodiment of the present invention.
Figure 2:
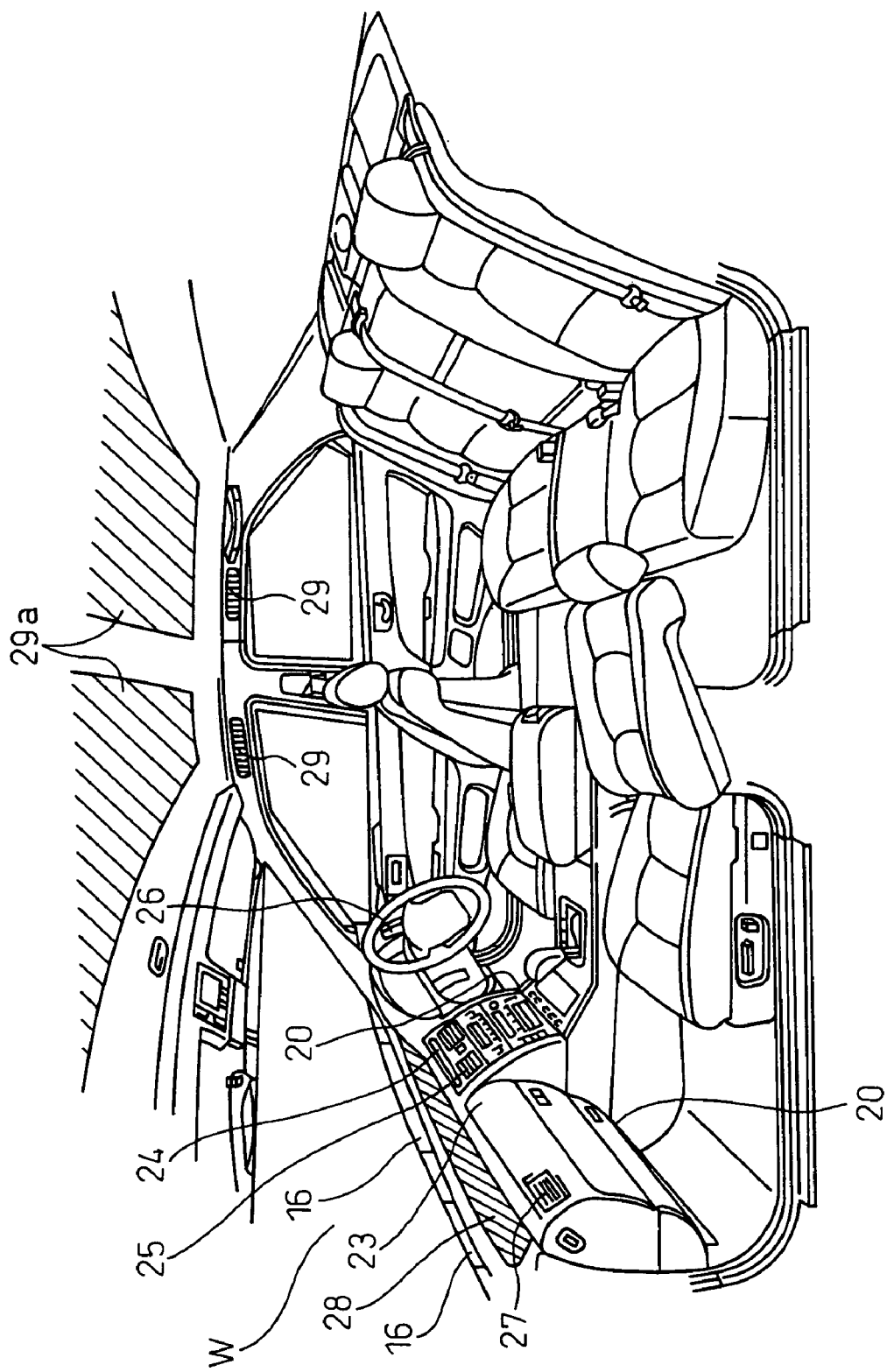
FIG. 2 is a perspective view of the inside of a vehicle compartment.

FIG. 1 is a view of the overall system of a first embodiment of the present invention, while FIG. 2 is a perspective view of the inside of a vehicle compartment. First, in the vehicular air-conditioner of the first embodiment, an air-conditioning unit 10 mounted in the vehicle compartment will be explained. An inside/outside air switching box 11 is arranged at an upstream-most side of the flow of air of the air-conditioning unit 10. Inside the switching box 11, a plate-shaped inside/outside air switching door 11a is pivotably provided. This inside/outside air switching door 11a is driven by an actuator 11b comprised of a servo motor and switches between introduction of inside air (air inside the vehicle compartment) and that of outside air (air outside the vehicle compartment).

A blower 12 is arranged at the downstream side of the inside/outside air switching box 11. This blower 12 is comprised of a centrifugal blower fan 12a and a drive motor 12b and blows air sucked in from the inside/outside air switching box 11 through an air passage 10a in the case of the air-conditioning unit 10 toward the inside of the vehicle compartment.

A filter 40 is arranged right before the blower 12 at its upstream side. By having all of the outside air or inside air introduced from the inside/outside air switching box 11 pass through this filter 40, the pollen or dust contained in the outside air or inside air is trapped. Further, this filter 40 is given a pollen allergen deactivating substance for deactivating the allergens causing hay fever attacks (for example, a phenolic polymer etc.). This pollen allergen deactivating substance bonds with the active sites of the pollen allergens to deactivate the allergens. Therefore, even if pollen once trapped on the filter 40 again enters the air, that pollen has been deactivated by the pollen allergen deactivating substance and therefore will not cause hay fever attacks at the driver. In this way, air passed through the filter 40 is blown into the vehicle compartment as clean air.

Note that this filter 40 may be arranged at any location in the air passage 10a so long as it can filter all of the air in the air passage 10a. For example, as shown by the broken line 40a in FIG. 1, it may also be arranged right after the blower 12 at its downstream side.

In the air passage 10a of the air-conditioning unit 10, an evaporator 13 is arranged right after the blower 12 at its downstream side, while a heater core 14 is arranged at the downstream side of the evaporator 13. The evaporator 13 forms a cooling use heat exchanger and cools blown air by a low pressure refrigerant of a known refrigeration cycle absorbing heat from the blown air and evaporating. The heater core 14 forms a heating use heat exchanger and heats the blown air using warm water (cooling water) from the not shown vehicle engine as a heat source.

At the upstream side of the heater core 14, an air mix door 15 serving as a blown air temperature adjusting means is pivotably provided. The opening degree of this air mix door 15 is adjusted by the door being driven by an actuator 15a. Due to this, the ratio of the air passing through the heater core 14 and the air bypassing the heater core 14 is adjusted to adjust the temperature of the air-conditioning air blown into the vehicle compartment.

At the downstream most side of the air-conditioning unit 10, a defroster door 17 for opening and closing a defroster vent 16 for blowing air-conditioning air toward the front window glass W, a face door 19 for opening and closing a face vent 18 for blowing air-conditioning air to the vicinity of the faces of drivers and their upper torsos, and a foot door 21 for opening and closing a foot vent 20 for blowing air-conditioning air toward the feet of the driver are provided.

These doors 17, 19, and 21 form the vent control means and are opened and closed in association by the common actuator 22 through a not shown link mechanism. By the opening/closing operation of these doors 17, 19, and 21, the known vent modes are switched and set.

At the approximate center in the left-right (width) direction of the vehicle above an instrument panel 3 arranged at the front of the vehicle compartment, two center face vents 24, 25 are arranged. Further, in the vicinity of the two ends in the left-right direction of the vehicle above the instrument panel 23, side face vents 26 and 27 are arranged. These center and side face vents 24 to 27 are supplied with air-conditioning air through the face vent 18. Note that the air-conditioning unit 10 is mounted at the space inside from the instrument panel 23 in the vehicle compartment. Further, FIG. 2 shows other vents as an instrument panel top vent 28 and ceiling vents 29. These will be explained later as another embodiment.

Next, explaining the electrical control unit of the present embodiment, an air-conditioning controller (air-conditioner ECU) 30 is a control means comprised of a microcomputer and its peripheral circuits. The air-conditioning controller 30 starts operating simultaneously with the ignition switch 38 being turned on so as to start up the vehicle engine. This air-conditioning controller 30 controls the operations of the actuators 11b, 15a, and 22 and the blower drive motor 12b by processing based on a predetermined control program in the microcomputer.

Further, the air-conditioning controller 30 receives as input signals from various types of sensors detecting the environmental conditions affecting the state of air-conditioning in the vehicle compartment. Specifically, the input signals from an inside air temperature sensor 31 for detecting the temperature Tr of the air inside the vehicle compartment (inside air temperature), an outside air temperature sensor 32 for detecting the temperature Tam of air outside the vehicle compartment (outside air temperature), an evaporator temperature sensor 33 for detecting a temperature Te of air blown out from the evaporator 13, a water temperature sensor 34 for detecting a water temperature Tw of the heater core 15, a sunlight sensor 35 for detecting an amount of sunlight Ts striking the inside of the vehicle compartment, a pollen sensor 36 for detecting the amount of pollen (or the concentration of pollen) inside the vehicle compartment, and a blowing temperature sensor 37 provided at the downstream-most side of the air-conditioning unit 10, for example, the side face vent 26 (or 27) for detecting the temperature of the air blown out from the vents are input to the air-conditioning controller 30.

Note that the pollen sensor 36 is a known small sized optical sensor which fetches air including pollen into a measurement chamber, irradiates the measurement chamber with laser light, and detects the light scattered by the spherical pollen grains in two axial directions so as to measure the amount of pollen in the measurement chamber.

An air-conditioning control panel 39 is arranged in the vicinity of the instrument panel 23 in the vehicle compartment. It is provided with a plurality of operating members 39a to 39f for manual operation by the driver. Operating signals of these plurality of operating members 39a to 39f are input to the air-conditioning controller 30. These plurality of operating members specifically include an AUTO switch 39a for setting an automatic control state of the air-conditioner, a temperature setting switch 39b for setting the temperature inside the vehicle compartment to a set temperature Tset desired by the driver, an inside/outside air switch 39c for setting an inside/outside air mode, a vent mode switch 39d for setting a vent mode (face, bilevel, foot, foot defroster, defroster), an air flow switch 39e for setting an air flow from the blower 12 and a pollen mode start switch 39f for instructing the start of operation in the pollen mode explained later, etc.

Note that the pollen mode start switch 39f may be a dedicated pushbutton switch provided on the instrument panel 23 etc. or may be a touch switch (not shown) of an air-conditioning control panel 39 displayed alternately with a navigation map etc. on a touch panel type navigation screen.

Figure 3:
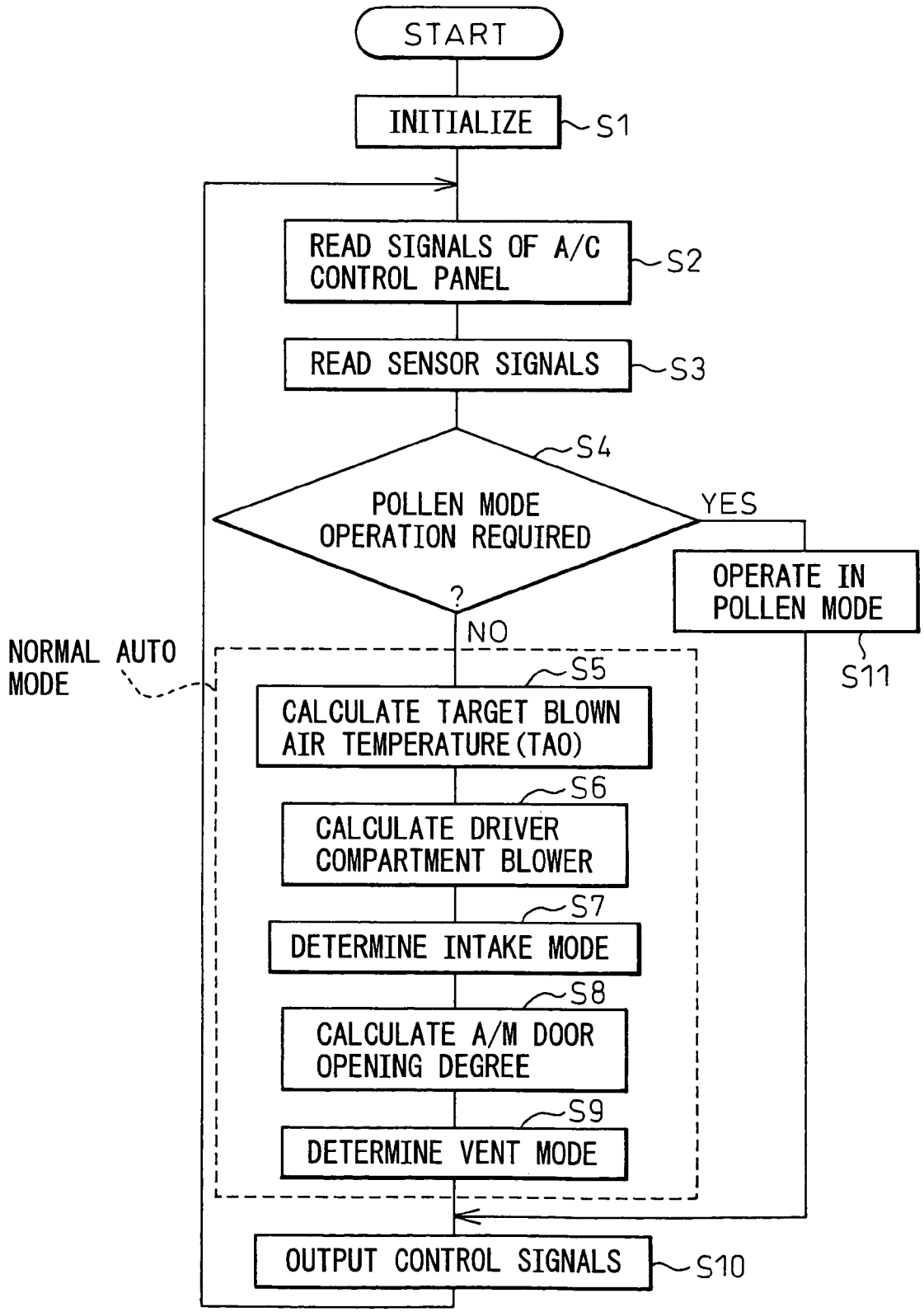
FIG. 3 is a flow chart of a main routine of air-conditioning control.

Next, the operation of the present embodiment will be explained based on the above configuration. FIG. 3 is a flow chart of a main routine executed by the air-conditioning controller 30. This control routine is started when the ignition switch 38 of the vehicle is turned on and is repeated at predetermined periods.

First, at step S1, the flag, timer, etc. are initialized. At the next step S2, the operation signals of the operating switches 39a to 39f of the air-conditioning control panel 39 are read. At the next step S3, the detection signals of the environmental conditions of the vehicle are read from the sensors 31 to 37 etc.

Next, at step S4, it is judged if operation under the pollen mode is required. Specifically, it is judged that operation under the pollen mode is required when the ignition switch 38 has just been turned on, when the pollen mode start switch 39f has been operated, when the amount of pollen detected by the pollen sensor 36 has become larger than a predetermined value, etc.

Note that the pollen mode start switch 39f is used for interrupting the normal air-conditioning control and starting operation under the pollen mode by driver operation when desiring to remove pollen entering the compartment from the window when opening it to pay a toll at a toll booth of a highway etc.

The pollen sensor 36 is used for interrupting the normal air-conditioning control and starting operation under the pollen mode when the amount of pollen entering the vehicle compartment from the outside becomes great while the vehicle is running in the outside air mode or when the amount of pollen carried inside becomes great when the driver gets into the vehicle while the vehicle is stopped.

Further, at step S4, if the operation under the pollen mode has already started and the elapsed time is within a predetermined timer time (for example, 4 minutes), it is judged that operation under the pollen mode is required and the routine proceeds to step S11.

When it is judged at step S4 that operation under the pollen mode is not required, the routine proceeds to step S5 for operation under the normal air-conditioning control (auto mode).

At step S5, the target blown air temperature TAO of the air-conditioning air blown into the vehicle compartment is calculated. This target blown air temperature TAO is the blown air temperature required for maintaining the inside of the vehicle compartment at a set temperature Tset of the temperature setting switch 39b and is the basic target value of the air-conditioning control. This target blown air temperature TAO is calculated by the following known formula (1) based on the set temperature Tset set by the temperature setting switch 39b of the air-conditioning control panel 39 and the inside air temperature Tr, the outside air temperature Tam, and the amount of sunlight Ts relating to the air-conditioning heat load detected by the different sensors.

$$TAO = Kset \cdot Tset - Kr \cdot Tr - Kam \cdot Tam - Ks \cdot Ts + C \quad (1)$$

where, Kset, Kr, Kam, and Ks are control gains and C is a correction constant

Figure 4A:
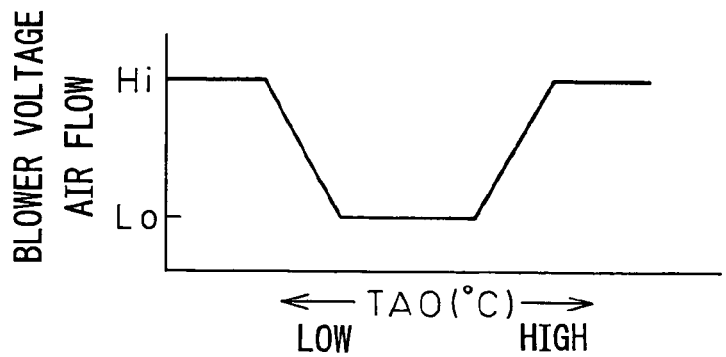
FIG. 4a is a graph of the control characteristics in an auto mode and shows a blower voltage characteristic.

Next, at step S6, the voltage applied to the motor 12b for driving the blower 12, that is, the blower voltage, is calculated as shown in FIG. 4A based on the above target blown air temperature TAO. This blower voltage can be set to raise the speed of the blower drive motor 12b, that is, the air flow of the vehicle compartment blown air, in the low temperature region and high temperature region of the target blown air temperature TAO and lower the air flow in the intermediate temperature region. Note that the level of the blower voltage is determined so as to generate an air flow in the range between the maximum air flow Hi and minimum air flow Lo able to be generated by the blower 12.

Figure 4B:
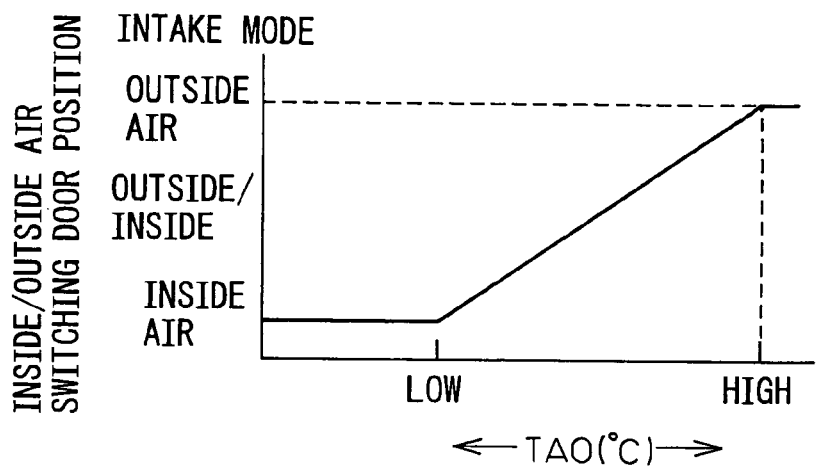
FIG. 4b is a graph of the control characteristics in an auto mode and shows an intake mode characteristic.

Next, at step S7, the inside/outside air intake mode (inside/outside air switching door position) is determined as shown in FIG. 4B based on the target blown air temperature TAO.

Next, at step S8, the target opening degree SW of the air mix door (A/M door) 15 for making the temperature of the air-conditioning air blown out into the vehicle compartment the target blown air temperature TAO is calculated. Specifically, the target air mix door opening degree SW is calculated by the following formula (2) based on the blown air temperature Te of the evaporator 13 (detected temperature of evaporator temperature sensor 33), warm water temperature Tw of the heater core 15 (detected temperature of water temperature sensor 34), and target blown air temperature TAO:

$$SW = \{(TAO - Te)/(Tw - Te)\} \cdot 100(\%) \quad (2)$$

Figure 4C:
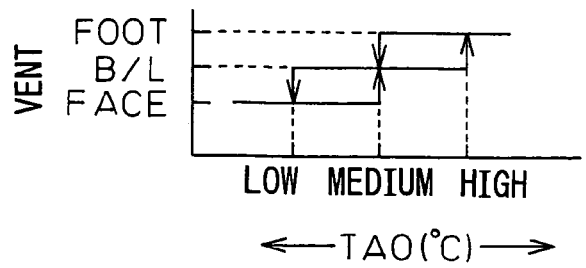
FIG. 4c is a graph of the control characteristics in an auto mode and shows a vent mode characteristic.

Next, at step S9, the vent mode (vent damper position) is determined as shown in FIG. 4C based on the target blown air temperature TAO. The FACE (face) mode of FIG. 4C is the mode for blowing air-conditioning air from the face vent 18, the B/L (bilevel) mode is the mode for blowing air-conditioning air from both the face vent 18 and the foot vent 20, and the FOOT (foot) mode is the mode for blowing air-conditioning air from the foot vent 20. At the time of the foot mode, it is also possible to blow out a small amount of air-conditioning air from the defroster vent 16.

Further, at step S10, control signals are output to the equipment under control to drive the equipment under control.

On the other hand, when it is judged at step S4 that operation under the pollen mode is required, the routine proceeds to step S11 where the various control signals are set for operation under the pollen mode, then the routine proceeds to step S10. Specifically, in this embodiment, at step S11, the control shown by the graph of the pollen mode of FIG. 5 is performed by interruption of the air-conditioning control in the normal auto mode.

Note that at step 11, the elapsed time of the operation under the pollen mode is counted. It is judged that the operation under the pollen mode should be ended at step S4 based on this elapsed time.

FIG. 5 shows the control characteristics in the elapsed time from ignition ON, that is, the start of the vehicle engine. In the figure, the broken line shows the characteristic in the normal air-conditioning control mode not utilizing the pollen mode, that is, the auto mode. That is, in the normal auto mode, for warmup control, the blower 12 is stopped (turned off) for a predetermined time from ignition ON (in the example of FIG. 5, 1 minute), the blower 12 is set to the minimum air flow Lo from 1 minute to 2 minutes from the start, then the air flow is increased along with time.

On the other hand, in the pollen mode in the present embodiment, the inside/outside air switching door 11a is switched so as to make the intake mode the inside air mode, the opening degree of the actuator 22 for switching vents is determined to make the vent mode the face mode, and the blower voltage of the blower 12 is set so that the state of the limit maximum air flow M1 is continued until a first time (3 minutes) from the start, then the air flow is increased along with time and then the pollen mode is shifted to the normal auto mode when the time counted by the timer becomes for example 4 minutes.

This limit maximum air flow M1 is an air flow between the minimum air flow Lo and maximum air flow Hi able to be generated by the blower 12 and is set in advance as the maximum air flow by which the driver will not feel discomfort considering the sensation of temperature of the driver. This for example may be set as the air flow M1 when determining the two levels M1 and M2 to be Lo<M1<M2<Hi between the minimum air flow Lo and the maximum air flow Hi. Further, the first time (for example 3 minutes) during which the limit maximum air flow M1 continues may be set to match with the air flow increase characteristic in the normal warmup control so as to obtain a comfortable vehicle compartment space without detracting from the sensation of temperature of the driver.

Note that for other control factors (target blown air temperature TAO, A/M door 15 opening degree, etc.), the control amounts in normal air-conditioning control are set.

As explained above, the operation under the pollen mode is started by the ignition switch 38 being turned on, the operation of the pollen mode starting switch 38f, or the increase in amount of pollen as determined by the pollen sensor 36. As shown in FIG. 6, in the inside air mode, clean air passed through the filter 40 is blown toward the vicinity of the face of the driver from the center and side face vents 24 to 27 at the limit maximum air flow M1. Due to this, in the vicinity of the face of the driver, clean air in which the pollen is trapped or clean air including deactivated pollen is blown, so pollen carried in by being deposited on the face or clothes etc. of the driver is blown away by this clean air and an atmosphere with little pollen is formed around the driver and thereby hay fever attacks are effectively suppressed. At this time, the flow of air blown out along with the start of the pollen is set to the limit maximum air flow M1 (Lo<M1<M2<Hi), so the maximum air flow which the driver is able to stand in terms of sensation of temperature strikes the vicinity of the face and therefore the pollen in the vicinity of the face is efficiently blown away.

FIG. 7 shows the rate of reduction of hog weed pollen measured in the vicinity of the face of a driver in an actual vehicle. The state of change along with time of the amount of pollen under various conditions is shown assuming the time when the ignition switch 38 has been turned on, that is, the time of start of the pollen mode, to be the 100% amount of pollen. Note that in FIG. 7, the curve A shows the case of the outside air mode without using the filter 40, the curve B shows the case of the outside air mode passing the air through a filter 40 with a 95% pollen removal efficiency, and the curve C shows the case of the pollen mode comprised of the inside air mode passing the air through the filter 40 with the same efficiency. In the curve A, the pollen reduction rate is saturated at 80% after 2 minutes from start. After this, the amount of pollen is not reduced. In the curve B, the pollen reduction rate reaches 20% after 4 minutes from start, but is saturated at this rate. Therefore, the curve B and the curve A show the difference based on the presence or absence of the filter 40. From this, by blowing clean air passed through the filter 40 to the vicinity of the face of the driver, the amount of pollen floating in the vicinity of the face of the driver can be reduced to 20% from initial rate after the elapse of 4 minutes from the start.

Further, with operation under the pollen mode of curve C, switching to the inside air mode enables the entry of pollen from the outside air duct (inside/outside air switching box 11) to be completely prevented, so it is learned that the pollen is almost completely eliminated after 3 minutes from the start. That is, in the pollen mode, there is the effect that the entry of pollen from the outside is inhibited in the inside air mode and the blowing of clean air passed through the filter 40 to the vicinity of the face removes the pollen from the vicinity of the face of the driver to create a pollen-free comfortable space and reduce the stress on the driver.

Second Embodiment

The second embodiment of the present invention does not make the blown air flow at the time of the start of the pollen mode the flat limit maximum air flow M1 like in the first embodiment, but adjusts it in accordance with the blown air temperature, in particular lowers the blown air flow when the blown air temperature is low. The point of difference from the first embodiment lies in the air-conditioner controller 30 only determines the instruction (blower air flow level) to be given to the motor 12b for driving the blower 12 using the detected temperature of the blown air temperature sensor 37. The rest of the configuration (FIG. 1 to FIG. 4) is similar to the first embodiment. Therefore, below, only the point of difference will be explained.

Figure 8:
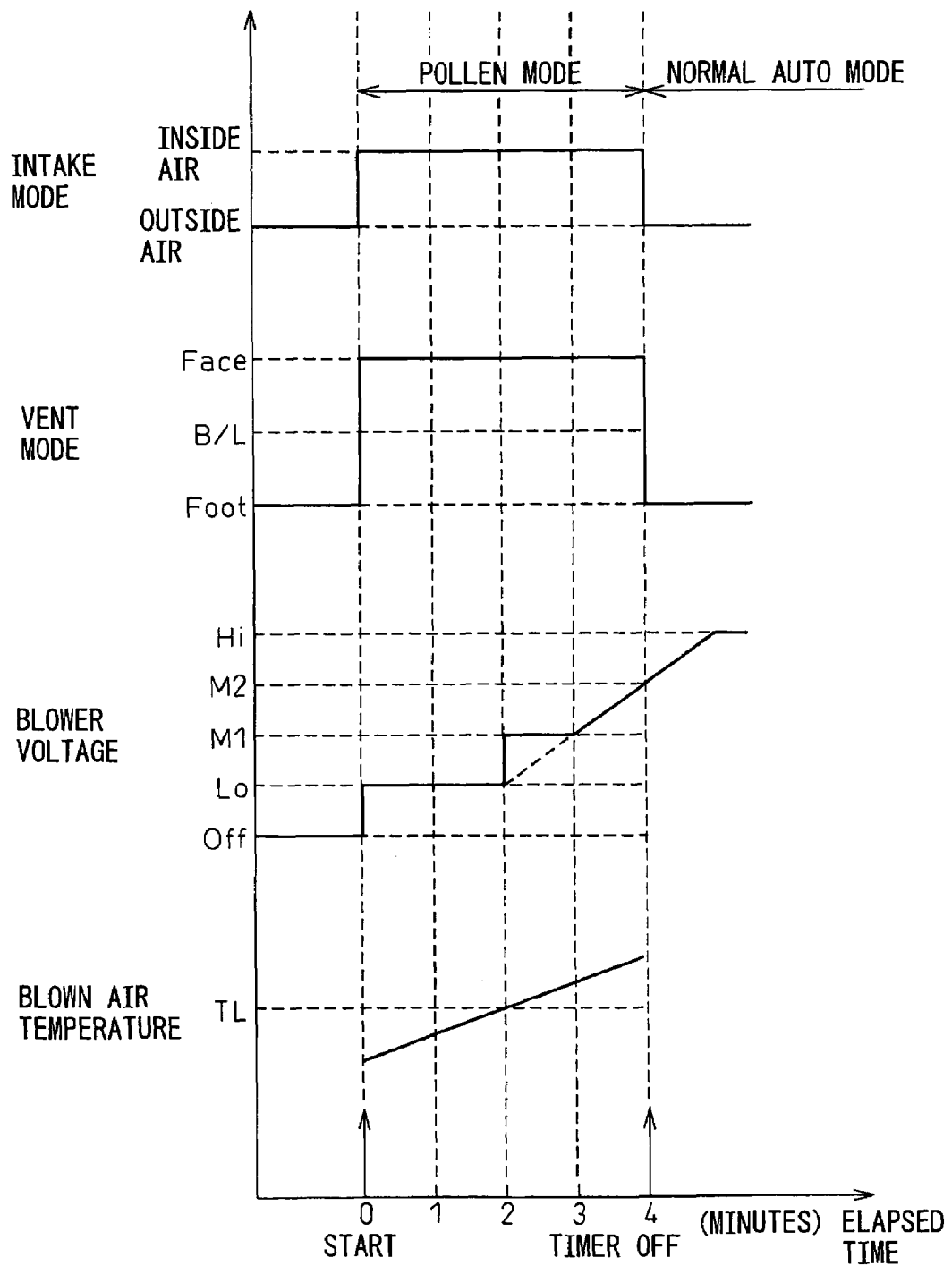
FIG. 8 is a graph of the control characteristics in a pollen mode in a second embodiment of the present invention.

FIG. 8 is a view of the control characteristics of the pollen mode in the second embodiment. In the same way as the first embodiment, as the ignition switch 38 is turned on, the pollen mode is started, whereupon the intake mode is set to the inside air mode and the vent mode is set to the face mode. Here, in the second embodiment, along with the rise in the blown air temperature as determined by the blown air temperature sensor 37 according to the rise in the water temperature, the air flow is set to the minimum air flow Lo while the blown air temperature is lower than a predetermined value TL (for example, the icing point) and is raised to the limit maximum air flow M1 when the blown air temperature exceeds a predetermined value TL. Further, after 3 minutes from the start, in the same way as the first embodiment, control is performed to increase the air flow from M1 along with time.

Due to this, it is possible to prevent the driver from being discomforted due to the sensation of temperature when the blown air flow is large when the blown air temperature is low and possible to increase the air flow to the limit maximum air flow M1 when the blown air temperature is the predetermined temperature TL or more so as to remove the pollen from the vicinity of the face of the driver and create a comfortable space.

Note that a comfortable space can also be created by stopping the blower 12 when the blown air temperature is the predetermined value TL or less and increasing the blown air flow to the limit maximum air flow M1 in the same way as above when the blown air temperature is the predetermined value TL or more.

Third Embodiment

The third embodiment does not make the blown air flow in a predetermined period after the start of the pollen mode a constant limit maximum air flow M1, but performs intermittent control so as to switch the blown air flow between the limit maximum air flow M1 and a first air flow smaller than the limit maximum air flow M1. The point of difference from the first embodiment lies only in the intermittent fluctuation of the level of the blower air flow used as the instruction given to the motor 12b for driving the blower 12 serving as the blower control means by the air-conditioner controller 30. The rest of the configuration (FIG. 1 to FIG. 4) is similar to the first embodiment. Therefore, only the points of difference will be explained below.

Figure 9:
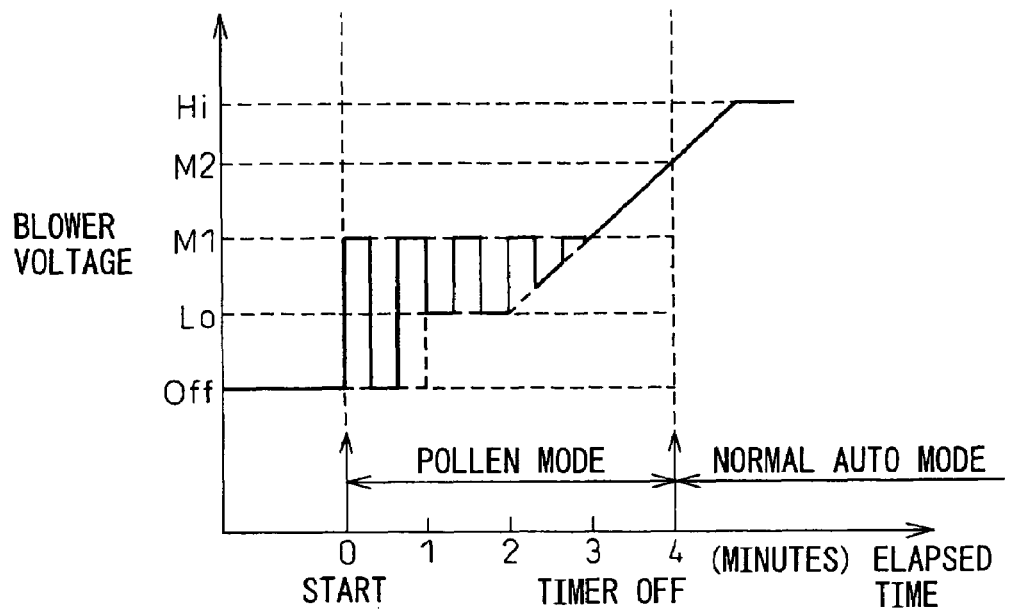
FIG. 9 is a graph of the control characteristics in a pollen mode in a third embodiment of the present invention.

FIG. 9 is a view of the control characteristics of the pollen mode in the third embodiment. That is, in the third embodiment, when the ignition switch 38 is turned on and the pollen mode is started, the blown air flow from the face vents 24 to 27 is controlled as shown in FIG. 9 so that the limit maximum air flow M1 and a first air flow changing along with time comprised by the air flow in normal warmup control are repeatedly alternated each 20 seconds.

Therefore, up to 1 minute after the start, the limit maximum air flow M1 and the first air flow comprised of "off" (air flow=0) are repeatedly alternated. From 1 minute to 2 minutes, the first air flow comprised of the minimum air flow Lo and the limit maximum air flow M1 are repeatedly alternated. After this, from 2 minutes to 3 minutes, the limit maximum air flow M1 and an air flow increasing along with time are repeatedly alternated, while from 3 minutes to 4 minutes, the air flow is made one which increases along with time. Further, from 4 minutes on, the pollen mode is shifted to the normal auto mode.

In this way, in the third embodiment, in the pollen mode, the air flow is intermittently controlled so that the air flow from the center and side face vents 24 to 27 alternates repeatedly between the limit maximum air flow M and "off" or Lo, whereby the limit maximum air flow M1 will not continuously strike the vicinity of the face of the driver and the air flow will change intermittently, so the pollen in the vicinity of the face can be reduced without greatly detracting from comfort.

Fourth Embodiment

The fourth embodiment does not intermittently change the level of the blower air flow of the blower 12 like in the third embodiment, but switches the vents, that is, switches between the face vent and other vents such as the foot vent so as to substantively intermittently change the blown air flow from the face vent. Therefore, the point of difference from the first embodiment lies only in the air-conditioner controller 30 giving instructions to the actuator 22 for driving the doors 17, 19, and 21 serving as the vent control means in the pollen mode. The rest of the configuration (FIG. 1 to FIG. 4) is similar to the first embodiment. Therefore, only the points of difference will be explained below.

Figure 10:
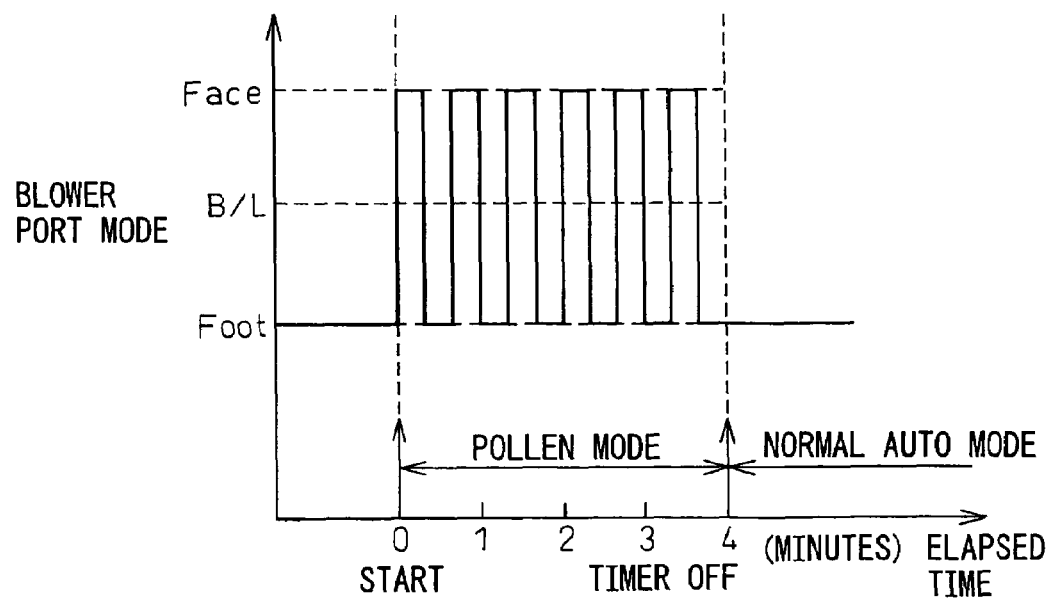
FIG. 10 is a graph of the control characteristics in a pollen mode in a fourth embodiment of the present invention.

FIG. 10 is a view of the control characteristics of the pollen mode in the fourth embodiment. That is, in the fourth embodiment, when the ignition switch 38 is turned on and the pollen mode is started, the vent mode is switched between the face mode and the foot mode for example every 20 seconds. The change in the blower voltage in the pollen mode at this time is a characteristic similar to the blower voltage characteristic (FIG. 5) of the first embodiment, so the air flow from the center and side face vents 24 to 27 changes intermittently similar to the third embodiment (FIG. 9) as a result.

In this way, in the fourth embodiment, by alternately changing the vent mode intermittently between the face mode and the foot mode, intermittent control is performed so that the blown air flow from the face vent alternately changes between the limit maximum air flow M1 and the first air flow comprised of the air flow=0. Therefore, in the same way as the third embodiment, the limit maximum air flow M1 will not continuously strike the vicinity of the face of the driver and the air flow will change intermittently, so the pollen in the vicinity of the face can be reduced without greatly detracting from comfort.

Other Embodiments

In the above embodiments, the example was shown of a pollen mode in which the vents for blowing clean air to the vicinity of the face of the driver were made the center and side face vents 24 to 27 provided at the instrument panel 23, but the invention is not limited to this. As shown in FIG. 2, air blown out from the defroster vent 16 also strikes the vicinity of the face of the driver, so may be used to remove the pollen from the vicinity of the face. Alternatively, it is possible to use the vent 28 at the top surface of the instrument panel, comprised of a large number of small holes in the top surface of the instrument panel 23 and used as a vent of air blown from the air-conditioning unit 10. That is, the air blown from the vent 28 on the top surface of the instrument panel is also sent to the vicinity of the face of the driver as an intermediate vent between the defroster vent 16 and the face vents 24 to 27 so as to be able to remove the pollen from the vicinity of the face.

Further, for example air blown from ceiling vents 29, 29a provided at the ceiling part at the tops of the doors or above the driver is also sent to the vicinity of the face of the driver, so can also be used to remove pollen from the vicinity of the face of the driver. Note that the air blown out from the ceiling vents 29 may be blown from the air-conditioning unit 10 provided at the front of the vehicle compartment shown in FIG. 1 through a duct buried in the chassis (not shown) or may be blown from an air-conditioning unit (not shown) provided separately at the trunk at the rear of the vehicle.

While the invention has been described with reference to specific embodiments chosen for purpose of illustration, it should be apparent that numerous modifications could be made thereto by those skilled in the art without departing from the basic concept and scope of the invention.

What is claimed is:

1. A vehicular air-conditioner comprising:
    blower control means for controlling a blower provided in an air passage of an air-conditioning unit;
    vent control means for selecting at least one of a plurality of vents provided at an end of said air passage and controlling the air from said blower so as to be blown from said selected vent to an inside of a vehicle compartment;
    an air-conditioning controller which controls operation of the blower control means and the vent control means based on a predetermined control program; wherein
    a pollen mode is set by the air-conditioning controller where a vent able to blow air to a vicinity of a face of a driver is selected from said plurality of vents by said vent control means and a predetermined amount of air is blown from said selected vent to the vicinity of the face of the driver in said vehicle compartment and said blower control means and said vent control means are controlled by the air-conditioning controller so that operation under said pollen mode is started when an ignition switch of said vehicle is initially turned on;
    said blower control means is controlled by the air-conditioning controller to make a level of air flow of said blower at the time of start of said pollen mode a limit maximum air flow set to a magnitude between a minimum air flow and a maximum air flow;
    said blower control means is controlled by the air-conditioning controller to control the level of air flow in said pollen mode so that said limit maximum air flow continues for a specified time from the start of said pollen mode; and
    after an elapse of a preset time from the start of said pollen mode, said air conditioning controller ends said pollen mode and said air conditioning controller controls said blower control means and said vent control means so that operation under a normal auto mode of said vehicular air-conditioner is set.

2. A vehicular air-conditioner as set forth in claim 1, wherein said air passage is provided with a filter for trapping pollen.

3. A vehicular air-conditioner as set forth in claim 1, wherein:
    said air-conditioning unit is provided at an upstream side of said blower with an inside/outside air switching door for switching between an outside air mode where air from outside said vehicle compartment is introduced and an inside mode where air inside said vehicle compartment is introduced and is provided with inside/outside air switching control means for controlling said inside/outside air switching door, and
    in said pollen mode, said inside/outside air switching control means controls said inside/outside air switching door to said inside air mode.

4. A vehicular air-conditioner as set forth in claim 1, wherein, in said pollen mode, said blower control means sets the level of air flow at the time of start of said pollen mode to the minimum air flow or stops said blower when a temperature of air blown in the vicinity of the said vent falls to a predetermined temperature or less and sets said level of air flow to the limit maximum air flow when said blown air temperature exceeds said predetermined temperature.

5. A vehicular air-conditioner as set forth in claim 1, wherein, in said pollen mode, the air flow is intermittently controlled so that the flow of air blown to the vicinity of the face of said driver is switched between the limit maximum air flow and a first air flow of a level smaller than said limit maximum air flow.

6. A vehicular air-conditioner as set forth in claim 5, wherein said blower control means intermittently controls said air flow by switching the level of air flow of said blower between the at least two levels of said limit maximum air flow and first air flow.

7. A vehicular air-conditioner as set forth in claim 5, wherein said vent control means alternately switches between a period of blowing air of said limit maximum air flow from said selected vent able to blow air to the vicinity of the face of the driver and a period of blowing air from a vent other than said selected vent so as to intermittently control said air flow.

8. A vehicular air-conditioner as set forth in claim 1, wherein provision is made of a pollen mode start switch and said pollen mode is also started by operation of said pollen mode start switch by said driver.

9. A vehicular air-conditioner as set forth in claim 1, wherein provision is made of a pollen sensor for measuring an amount of pollen in said vehicle compartment and said pollen mode is also started when the amount of pollen measured exceeds a predetermined amount.

10. A vehicular air-conditioner as set forth in claim 9, wherein said pollen mode is ended when the amount of pollen measured falls to said predetermined amount or less.

11. A vehicular air-conditioner as set forth in claim 1, wherein the operation under the pollen mode is given priority over the determined vent mode to calculate the basic target value of the air-conditioning control and to select the vent.

12. A vehicular air-conditioner as set forth in claim 1, wherein the operation under the pollen mode is performed by interrupting the air-conditioning control, in the normal auto mode, to calculate the basic target value of the air-conditioning control and to select the vent.

13. A vehicular air-conditioner as set forth in claim 1, wherein provision is made of judgment means for judging the operation requirement under the pollen mode, the judgment means judges the requirement when the ignition switch is initially turned on, when a pollen mode start switch is operated, and when a predetermined signal has been output from a pollen sensor, and the operation under the pollen mode is then performed.

14. A vehicular air-conditioner as set forth in claim 1, wherein said limit maximum air flow increases along with the elapse of time after the specified time.

15. A vehicular air-conditioner as set forth in claim 1, wherein said pollen mode is always started when the ignition switch of said vehicle is initially turned on.

16. A vehicular air-conditioner comprising:
blower control means for controlling a blower provided in an air passage of an air-conditioning unit;
vent control means for selecting at least one of a plurality of vents provided at an end of said air passage and controlling the air from said blower so as to be blown from said selected vent to an inside of a vehicle compartment,
an air-conditioning controller which controls operation of the blower control means and the vent control means based on a predetermined control program; wherein
a pollen mode is set by the air-conditioning controller where a vent able to blow air to a vicinity of a face of a driver is selected from said plurality of vents by said vent control means and a predetermined amount of air is blown from said selected vent to the vicinity of the face of the driver in said vehicle compartment and said blower control means and vent control means are controlled by the air-conditioning controller so that operation under said pollen mode is started when an ignition switch of said vehicle is initially turned on; and
after an elapse of a preset time from the start of said pollen mode, said air conditioning controller ends said pollen mode and said air conditioning controller controls said blower control means and said vent control means so that operation under a normal auto mode of said vehicular air-conditioner is set.

* * * * *